United States Patent
Hiramatsu

(10) Patent No.: US 12,535,447 B2
(45) Date of Patent: Jan. 27, 2026

(54) SENSOR AND CAPACITOR DEVICE

(71) Applicant: KABUSHIKI KAISHA TOSHIBA, Tokyo (JP)

(72) Inventor: Naoki Hiramatsu, Yokohama Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 385 days.

(21) Appl. No.: 18/350,695

(22) Filed: Jul. 11, 2023

(65) Prior Publication Data

US 2024/0302309 A1    Sep. 12, 2024

(30) Foreign Application Priority Data

Mar. 7, 2023 (JP) ................. 2023-034897

(51) Int. Cl.
  *G01N 27/22* (2006.01)
  *H01G 4/005* (2006.01)
(52) U.S. Cl.
  CPC ........... *G01N 27/226* (2013.01); *H01G 4/005* (2013.01); *G01N 2027/222* (2013.01)
(58) Field of Classification Search
  CPC . G01N 27/22; G01N 2072/222; G01N 27/226
  See application file for complete search history.

(56) References Cited

U.S. PATENT DOCUMENTS

| | | |
|---|---|---|
| 2019/0086377 A1 | 3/2019 | Ikehashi et al. |
| 2022/0018820 A1* | 1/2022 | Hiramatsu ........... G01N 27/228 |
| 2023/0078060 A1* | 3/2023 | Yamazaki ............... G01R 1/203 |
| | | 324/126 |

FOREIGN PATENT DOCUMENTS

JP    2019-56607 A    4/2019

* cited by examiner

*Primary Examiner* — Erika J. Villaluna
(74) *Attorney, Agent, or Firm* — Finnegan, Henderson, Farabow, Garrett & Dunner, LLP

(57) ABSTRACT

According to one embodiment, a sensor includes a base and an element section. The element section includes a fixed electrode, a first support structure, and a movable member. The first support structure includes, a first fixed member, a first intermediate member supported by the first fixed member, a first connecting member, a first support member, a first cross connecting member, a first cross fixed member, a first cross intermediate member, and a first cross connecting member. The first connecting member includes a first connecting portion, a first support connecting portion, and a first intermediate connecting portion provided between the first connecting portion and the first support connecting portion. The first cross connecting member is supported by the first cross intermediate member. The movable member includes a movable electrode. The movable member includes a first movable portion. The first movable portion is supported by the first support connecting portion and the first cross connecting member.

19 Claims, 8 Drawing Sheets

SENSOR AND CAPACITOR DEVICE

CROSS-REFERENCE TO RELATED APPLICATIONS

This application is based upon and claims the benefit of priority from Japanese Patent Application No. 2023-034897, filed on Mar. 7, 2023; the entire contents of which are incorporated herein by reference.

FIELD

Embodiments described herein relate generally to a sensor and a capacitor device.

BACKGROUND

For example, there are sensors that detect gases such as hydrogen. It is desired to improve the characteristics of the sensor.

DETAILED DESCRIPTION

Figure 1:
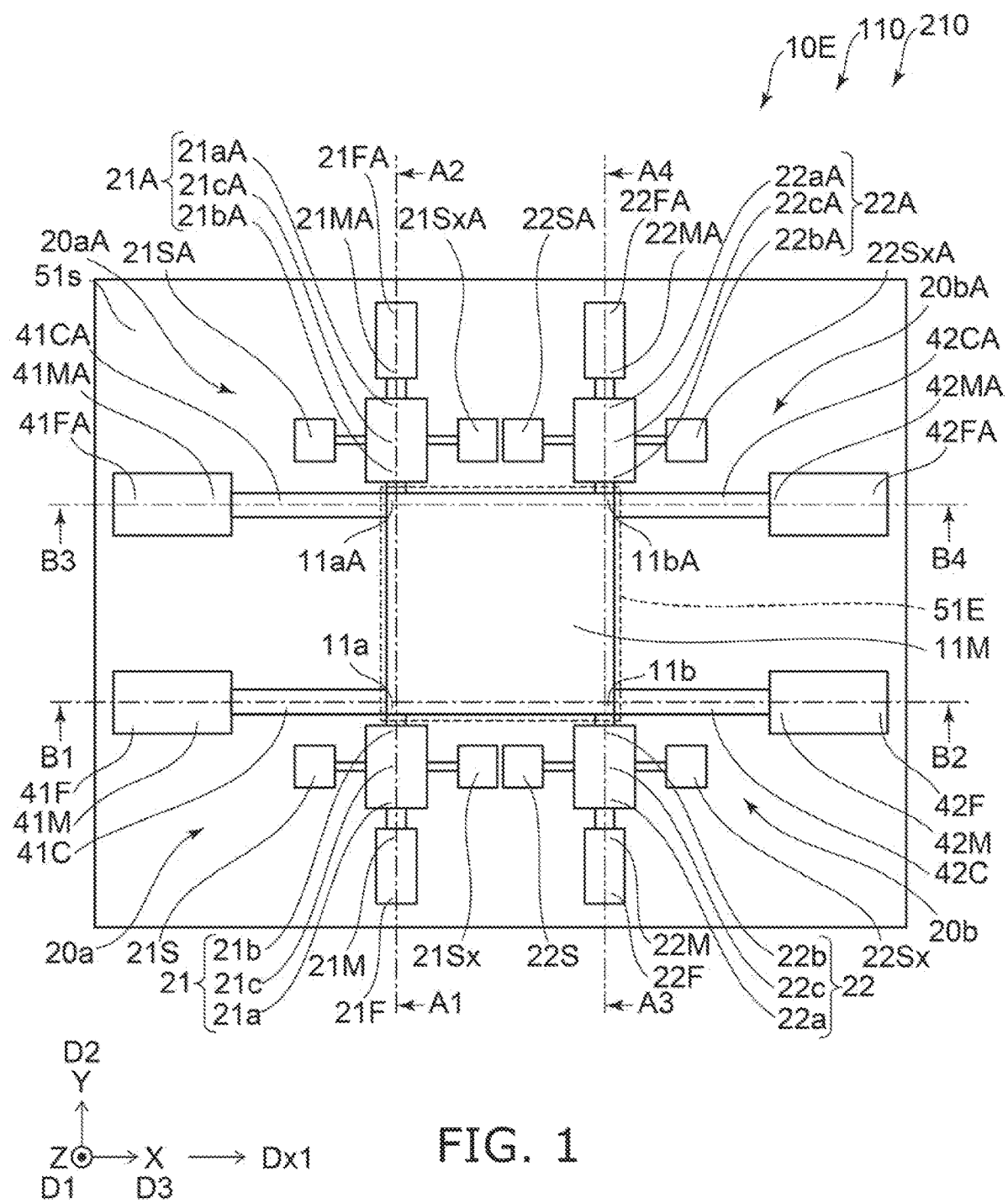
FIG. 1 is a schematic plan view illustrating a sensor according to a first embodiment.

According to one embodiment, a sensor includes a base and an element section. The element section includes a fixed electrode, a first support structure, and a movable member. The fixed electrode is fixed to the base. The first support structure includes, a first fixed member fixed to the base, a first intermediate member supported by the first fixed member, a first connecting member, a first support member, a first cross fixed member, a first cross intermediate member, and a first cross connecting member. The first connecting member is supported by the first intermediate member. The first connecting member includes a first connecting portion, a first support connecting portion, and a first intermediate connecting portion provided between the first connecting portion and the first support connecting portion. A direction from the first connecting portion to the first support connecting portion is along a second direction crossing a first direction from the base to the fixed electrode. The first support member is fixed to the base. The first support member supports the first intermediate connecting portion. The first cross fixed member is fixed to the base. The first cross intermediate member is supported by the first cross fixed member. The first cross connecting member is supported by the first cross intermediate member. The movable member includes a movable electrode. The movable member includes a first movable portion. The first movable portion is supported by the first support connecting portion and the first cross connecting member. A first gap is provided between the fixed electrode and the movable member.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic plan view illustrating a sensor according to a first embodiment.

FIGS. 2 to 5 are schematic cross-sectional views illustrating the sensor according to the first embodiment.

Figure 2:
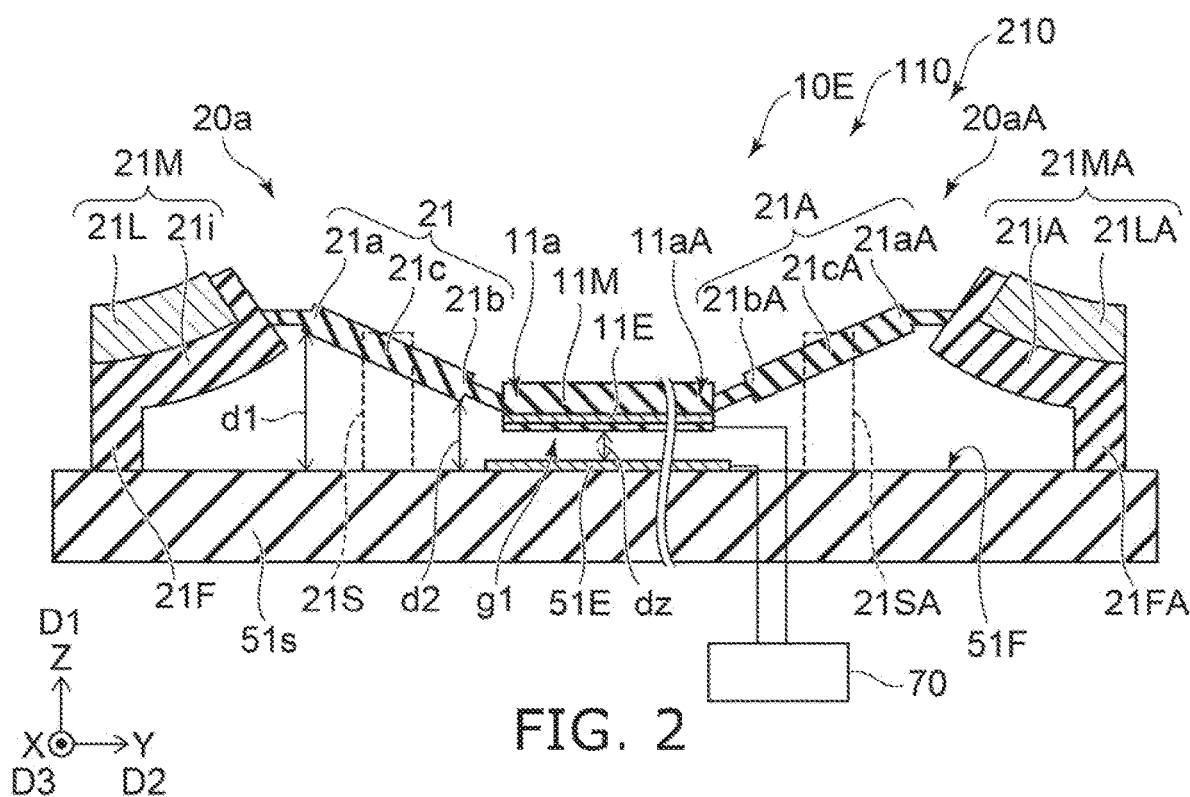
FIG. 2 is a schematic cross-sectional view illustrating the sensor according to the first embodiment.
Figure 3:
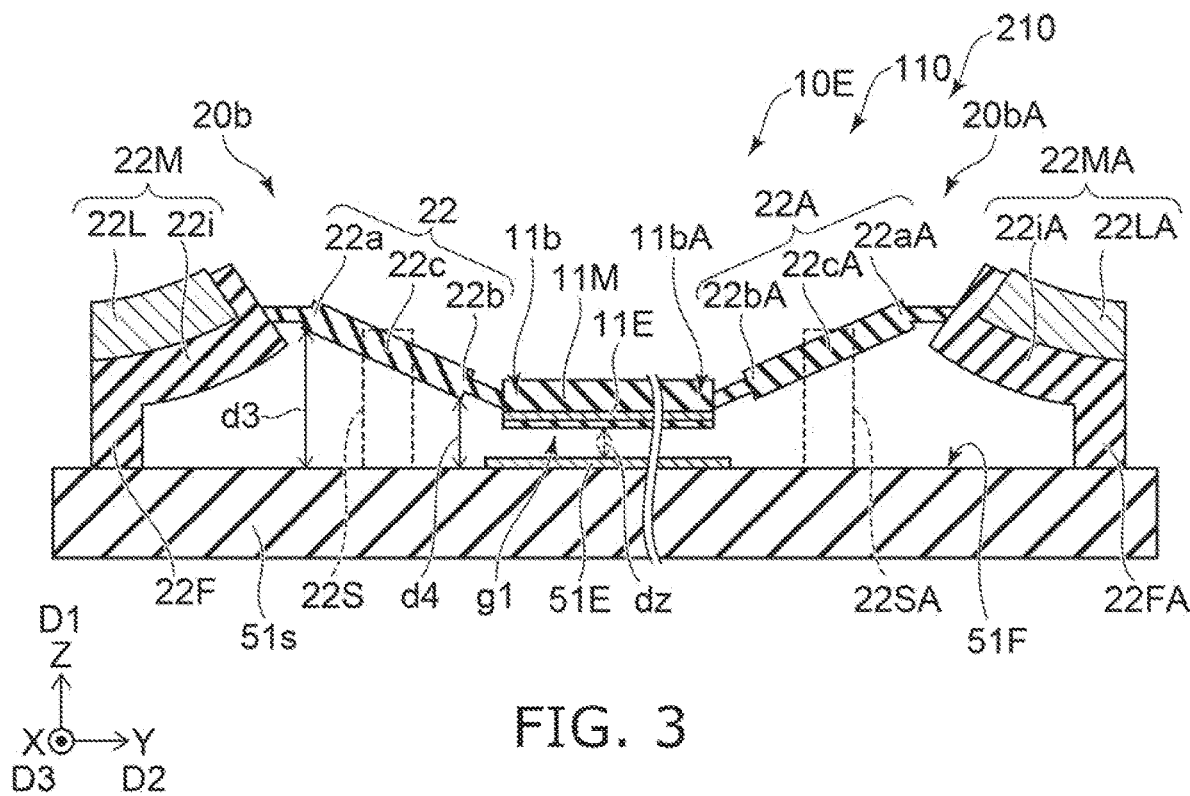
FIG. 3 is a schematic cross-sectional view illustrating the sensor according to the first embodiment.
Figure 4:
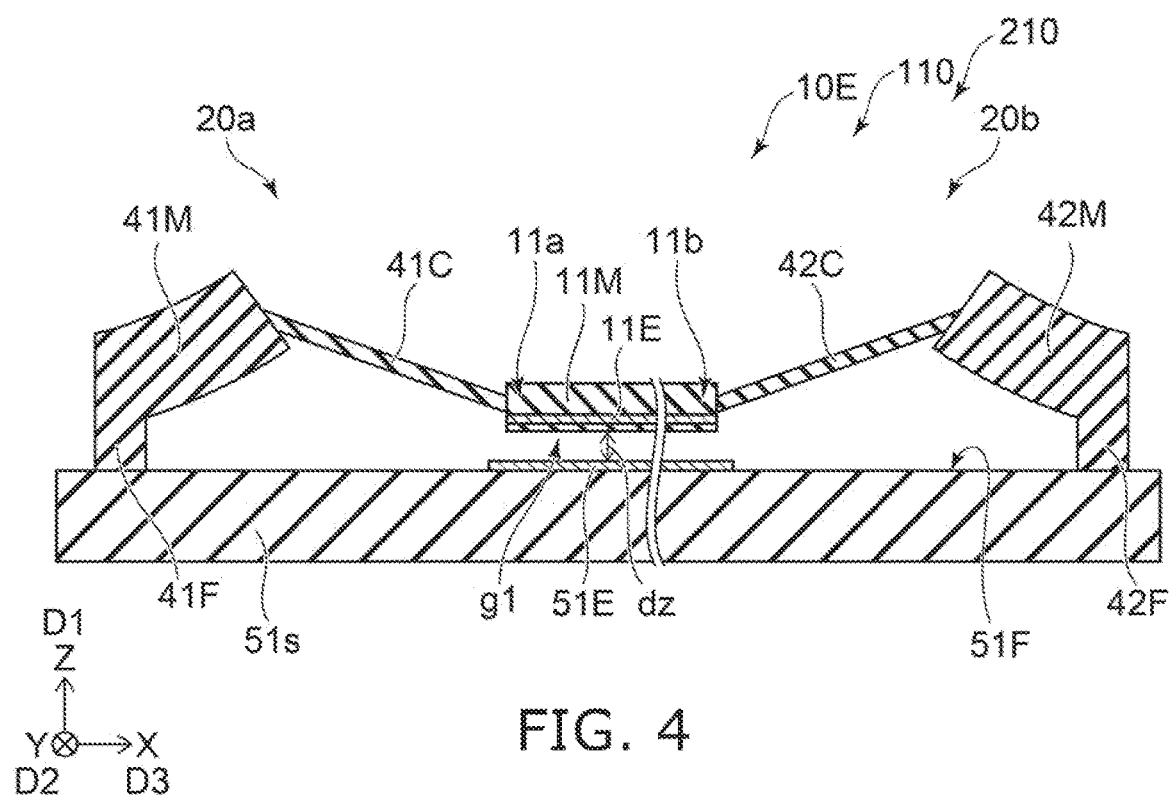
FIG. 4 is a schematic cross-sectional view illustrating the sensor according to the first embodiment.
Figure 5:
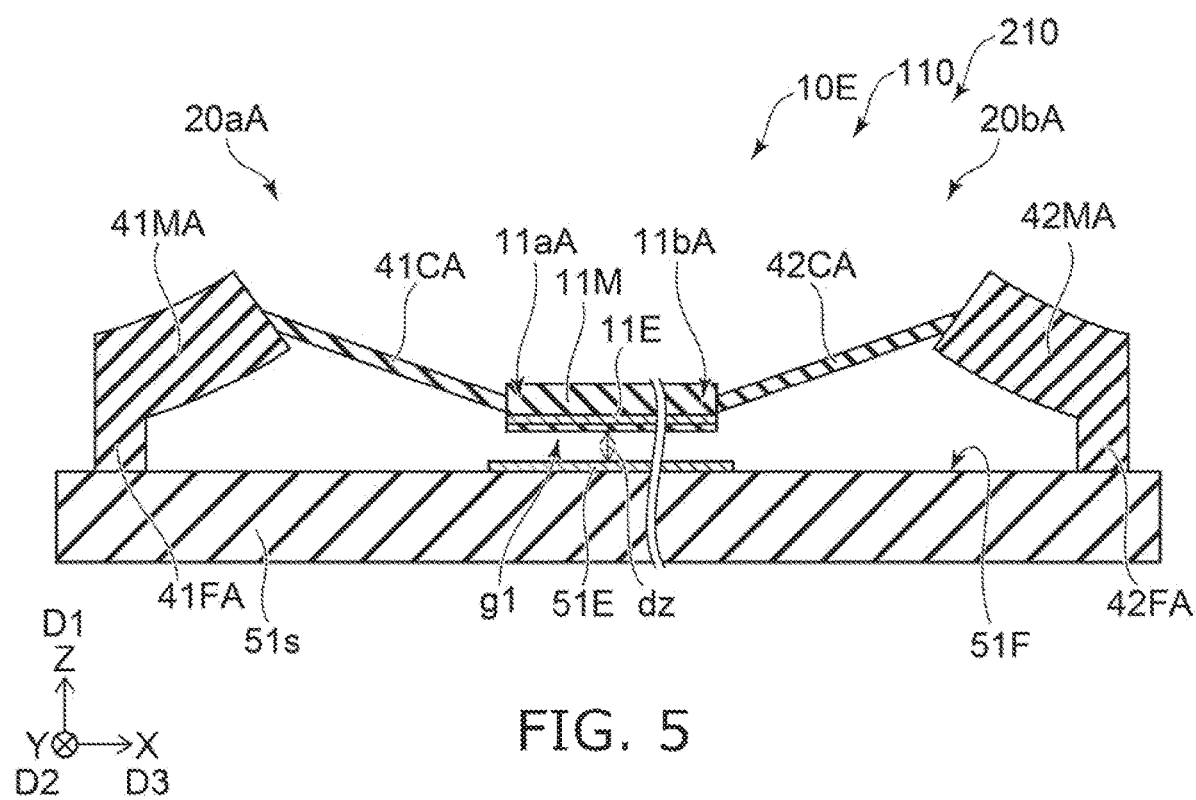
FIG. 5 is a schematic cross-sectional view illustrating the sensor according to the first embodiment.

FIG. 2 is a cross-sectional view taken along the line A1-A2 of FIG. 1. FIG. 3 is a cross-sectional view taken along the line A3-A4 of FIG. 1. FIG. 4 is a cross-sectional view taken along the line B1-B2 of FIG. 1. FIG. FIG. 5 is a cross-sectional view along the line B3-B4 of FIG. 1.

As shown in FIGS. 1 to 5, a sensor 110 according to the embodiment includes a base 51s and an element section 10E. The base 51s includes, for example, a silicon substrate. The base 51s may include electronic elements such as transistors.

The element section 10E includes a fixed electrode 51E, a first support structure 20a, and a movable member 11M. The fixed electrode 51E is fixed to the base 51s. A first direction D1 from the base 51s to the fixed electrode 51E is defined as a Z-axis direction. A direction perpendicular to the Z-axis direction is defined as a Y-axis direction. A direction perpendicular to the Z-axis direction and the Y-axis direction is defined as an X-axis direction.

As shown in FIG. 2, the base 51s includes a first face 51F. The first face 51F is substantially along the X-Y plane. The fixed electrode 51E is provided on the first face 51F.

The first support structure 20a includes a first fixed member 21F, a first intermediate member 21M, a first connecting member 21, a first cross fixed member 41F, a first cross intermediate member 41M and a first cross connecting member 41C.

The first fixed member 21F is fixed to the base 51s. The first intermediate member 21M is supported by the first fixed member 21F. The first connecting member 21 is supported by the first intermediate member 21M.

The first connecting member 21 includes a first connecting portion 21a, a first support connecting portion 21b, and a first intermediate connecting portion 21c. The first intermediate connecting portion 21c is provided between the first connecting portion 21a and the first support connecting portion 21b. A direction from the first connecting portion 21a to the first support connecting portion 21b is along a second direction D2. The second direction D2 crosses the first direction D1 from the base 51s to the fixed electrode 51E. In this example, the second direction D2 is along the Y-axis direction.

The first support member 21S is fixed to the base 51s. The first support member 21S supports the first intermediate connecting portion 21c.

For example, a first cross direction Dx1 from the first support member 21S to the first intermediate connecting portion 21c crosses a plane including the first direction D1 and the second direction D2.

In this example, the element section 10E further includes a first opposing support member 21Sx. The first opposing support member 21Sx is fixed to the base 51s. The first opposing support member 21Sx supports the first intermediate connecting portion 21c. The first intermediate connecting portion 21c is provided between the first support member 21S and the first opposing support member 21Sx.

The first cross fixed member 41F is fixed to the base 51s. The first cross intermediate member 41M is supported by the first cross fixed member 41F. The first cross connecting member 41C is supported by the first cross intermediate member 41M.

The movable member 11M includes a movable electrode 11E. The movable member 11M includes a first movable portion 11a. The first movable portion 11a is supported by the first support connecting portion 21b and the first cross connecting member 41C. A first gap g1 is provided between the fixed electrode 51E and the movable member 11M. A part of the first gap g1 is provided between the base 51s and the first connecting member 21. Another part of the first gap g1 is provided between the base 51s and the first cross connecting member 41C.

As shown in FIG. 1, a direction from the first connecting member 21 to the first movable portion 11a is along the second direction D2. A direction from the first cross connecting member 41C to the first movable portion 11a crosses the first direction D1 and the second direction D2. For example, the direction from the first cross connecting member 41C to the first movable portion 11a is along a third direction D3. In this example, the third direction D3 is, for example, along the first cross direction Dx1.

As shown in FIG. 2, a distance along the first direction D1 between the base 51s and the first connecting portion 21a is defined as a first distance d1. A distance along the first direction D1 between the base 51s and the first support connecting portion 21b is defined as a second distance d2. In the embodiment, when the first distance d1 decreases, the second distance d2 increases. When the first distance d1 increases, the second distance d2 decreases. In the first connecting member 21, the height of the first intermediate connecting portion 21c is fixed, and the portions on both sides thereof (the first connecting portion 21a and the first support connecting portion 21b) are displaced in opposite directions. The first connecting member 21 has a seesaw structure.

When an end of the first intermediate member 21M (the end on the side of the first connecting member 21) tries to displace toward the base 51s, the first support connecting portion 21b tries to displace away from the base 51s.

On the other hand, when the end of the first cross intermediate member 41M (the end on the side of the first cross connecting member 41C) tries to displace as to approach the base 51s, the first cross connecting member 41C tries to displace closer to the base 51s.

Thus, opposite displacements occur in the two beams (the first connecting member 21 and the first cross connecting member 41C) supporting the first movable portion 11a of the movable member 11M. Thereby, for example, the influence of temperature can be suppressed. For example, higher precision detection is possible.

In one example, the first intermediate member 21M and the first cross intermediate member 41M deform in response to temperature. For example, when the temperature rises, the end of the first intermediate member 21M and the end of the first cross intermediate member 41M are displaced closer to the base 51s. At this time, as described above, the direction of displacement in the first support connecting portion 21b is opposite to the direction of displacement in the first cross connecting member 41C. As a result, for example, unintended displacement of the movable member 11M due to temperature can be suppressed.

In another example, the first intermediate member 21M is deformable according to a state of the detection target. The rotation angle of the first connecting member 21 changes due to the deformation of the first intermediate member 21M. This changes the inter-electrode distance dz between the fixed electrode 51E and the movable electrode 11E. The change in the distance dz between the electrodes changes the capacitance between these electrodes. The state of the detection target can be detected by detecting the change in capacitance. The state of the detection target is, for example, concentration of the detection target gas. The capacitance may be detected, for example, by a controller 70 (see FIG. 2).

In the above-described example in which the first intermediate member 21M is deformed in accordance with the state of the detection target, the effect of temperature, for example, can be suppressed by providing the first cross connecting member 41C in which the direction of displacement is opposite. Detection with higher accuracy is possible.

In one example, as shown in FIG. 2, the first intermediate member 21M includes a first layer 21L. The first layer 21L is, for example, a sensitive film. The volume of the first layer 21L changes according to the concentration of the detection target (for example, the detection target gas). This is due to the detection target entering the first layer 21L. The first intermediate member 21M including the first layer 21L functions, for example, as an actuator.

For example, when the concentration of the detection target is high, the volume of the first layer 21L increases. As a result, the first intermediate member 21M is deformed, and the first connecting portion 21a approaches the base 51s. Accordingly, the first support connecting portion 21b is away from the base 51s. Therefore, when the concentration of the detection target increases, the inter-electrode distance dz increases and the capacitance decreases.

On the other hand, a reference example is conceivable in which the inter-electrode distance dz increases as the concentration of the detection target increases. In this reference example, if the inter-electrode distance dz becomes excessively short, the movable member 11M comes into contact with the fixed electrode 51E, making it difficult to obtain normal operation. In this reference example, if the inter-electrode distance dz in the initial state is set long, the sensitivity is lowered.

In the embodiment, the first cross intermediate member 41M need not be provided with a sensitive film (for example, the first layer 21L), and the first intermediate member 21M need not be provided with a sensitive film. In this case, for example, when the concentration of the detection target increases, the distance dz between the electrodes increases and the capacitance decreases due to the first connecting member 21 of the seesaw structure. The detection target can be properly detected even at a high concentration. Even if the inter-electrode distance dz is set short in an initial state, the inter-electrode distance dz does not become shorter than the initial state. Thereby, in the embodiment, the inter-electrode distance dz in the initial state can be made smaller than the value in the reference example. Thereby, a detection with higher sensitivity can be possible. According to the embodiments, a wide dynamic range is obtained. High sensitivity is obtained. According to the embodiment, a sensor capable of improving characteristics can be provided.

For example, in the embodiment, first state and a second state can exist. The concentration in the first state of the detection target existing around the element section 10E is higher than the concentration in the second state of the detection target. The first state is, for example, a high concentration state. The second state is the low concentration state.

For example, the first distance d1 in the first state is shorter than the first distance d1 in the second state. The first distance d1 becomes short when the concentration of the detection target is high. For example, the second distance d2 in the first state is longer than the second distance d2 in the second state. The second distance d2 increases when the concentration of the detection target is high.

In one example, the first layer 21L included in the first intermediate member includes at least one selected from the group consisting of, for example, palladium (Pd), platinum (Pt), and gold (Au). The first layer 21L may further includes, for example, at least one selected from the group consisting of silicon (Si), phosphorus (P), boron (B), copper (Cu), silver (Ag), nickel (Ni), gold (Au), iron (Fe) and chromium (Cr). The first layer 21L may include, for example, an alloy including a first element and a second element. The first element includes, for example, at least one element selected from the group consisting of Mg, Ti, Zr, Ca, La, Mn and V. The second element includes, for example, at least one element selected from the group consisting of Ni, Cu, Fe, Co, Cr, Mn, V and Nb. The above materials can incorporate, for example, hydrogen. In this case, the detection target includes hydrogen. The first intermediate member 21M is deformed in accordance with the concentration of hydrogen.

As shown in FIG. 2, in this example, the first intermediate member 21M includes a first insulating layer 21i. The first insulating layer 21i is provided between the base 51s and the first layer 21L. For example, when the concentration of the detection target increases, the volume of the first layer 21L increases. On the other hand, the volume of the first insulating layer 21i does not substantially change. As a result, the end portion (terminal on the side of the first connecting member 21) of the first intermediate member 21M is displaced so as to approach the base 51s. The first support connecting portion 21b is displaced so as to be away from the base 51s. In response, the movable member 11M is displaced away from the base 51s.

As shown in FIGS. 1, 2 and 5, the element section 10E may further include a first other support structure 20aA. The first other support structure 20aA includes a first other fixed member 21FA, a first other intermediate member 21MA, a first other connecting member 21A, a first other support member 21SA, a first other cross fixed member 41FA, a first other cross intermediate member 41MA, and a first other cross connecting member 41CA.

The first other fixed member 21FA is fixed to the base 51s. The first other intermediate member 21MA is supported by the first other fixed member 21FA. The first other connecting member 21A is supported by the first other intermediate member 21MA.

The first other connecting member 21A includes a first other connecting part 21aA, a first other support connecting part 21bA, and a first other intermediate connecting part 21cA. The first other intermediate connecting portion 21cA is provided between the first other connecting portion 21aA and the first other support connecting portion 21bA. A direction from the first other connecting portion 21aA to the first other support connecting portion 21bA crosses the first direction D1. In this example, the direction from the first other support connecting portion 21bA to the first other connecting portion 21aA is along the second direction D2.

The first other support member 21SA is fixed to the base 51s. The first other support member 21SA supports the first other intermediate connecting portion 21cA. As shown in FIG. 1, in this example, the element section 10E further includes a first other opposing support member 21SxA. The first other opposing support member 21SxA is fixed to the base 51s. The first other opposing support member 21SxA supports the first other intermediate connecting portion 21bA. The first other intermediate connecting portion 21cA is provided between the first other support member 21SA and the first other opposing support member 21SxA. As shown in FIG. 2, a part of the first gap g1 is provided between the base 51s and the first other connecting member 21A.

As shown in FIGS. 1 and 5, the first other cross fixed member 41FA is fixed to the base 51s. The first other cross intermediate member 41MA is supported by the first other cross fixed member 41FA. The first other cross connecting member 41CA is supported by the first other cross intermediate member 41MA.

The movable member 11M further includes a first other movable portion 11aA. The first other movable portion 11aA is supported by the first other support connecting portion 21bA and the first other cross connecting member 41CA.

By providing the first other support structure 20aA, for example, the movable member 11M is more stably supported.

As shown in FIG. 1, the element section 10E may further include a second support structure 20b. The second support structure 20b includes a second fixed member 22F, a second intermediate member 22M, a second connecting member 22, a second support member 22S, a second cross fixed member 42F, a second cross intermediate member 42M and a second cross connecting member 42C.

As shown in FIG. 3, the second fixed member 22F is fixed to the base 51s. The second intermediate member 22M is supported by the second fixed member 22F. The second connecting member 22 is supported by the second intermediate member 22M.

The second connecting member 22 includes a second connecting portion 22a, a second support connecting portion 22b and a second intermediate connecting portion 22c. The second intermediate connecting portion 22c is provided between the second connecting portion 22a and the second support connecting portion 22b. A direction from the second connecting portion 22a to the second support connecting portion 22b crosses the first direction D1. In this example, a direction from the second connecting portion 22a to the second support connecting portion 22b is along the second direction D2.

The second support member 22S is fixed to the base 51s. The second support member 22S supports the second intermediate connecting portion 22c.

In this example, the element section 10E further includes a second opposing support member 22Sx. The second opposing support member 22Sx is fixed to the base 51s. The second opposing support member 22Sx supports the second intermediate connecting portion 22c. The second intermediate connecting portion 22c is provided between the second support member 22S and the second opposing support member 22Sx.

As shown in FIG. 3, a distance along the first direction D1 between the base 51s and the second connecting portion 22a is defined as a third distance d3. A distance along the first direction D1 between the base 51s and the second support connecting portion 22b is defined as a fourth distance d4. In the embodiment, as the third distance d3 decreases, the fourth distance d4 increases. As the third distance d3 increases, the fourth distance d4 decreases. In the second connecting member 22, the height of the second intermediate connecting portion 22c is fixed, and the portions on both sides thereof (the second connecting portion 22a and the second support connecting portion 22b) are displaced in opposite directions.

As shown in FIG. 4, the second cross fixed member 42F is fixed to the base 51s. The second cross intermediate member 42M is supported by the second cross fixed member 42F. The second cross connecting member 42C is supported by the second cross intermediate member 42M.

The movable member 11M further includes a second movable portion 11b. The second movable portion 11b is supported by the second support connecting portion 22b and the second cross connecting member 42C.

As shown in FIG. 1, the element section 10E may further include a second other support structure 20bA. The second other support structure 20bA includes a second other fixed member 22FA, a second other intermediate member 22MA, a second other connecting member 22A, a second other support member 22SA, a second other cross fixed member 42FA, a second other cross intermediate member 42MA and a second other cross connecting member 42CA.

As shown in FIG. 3, the second other fixed member 22FA is fixed to the base 51s. The second other intermediate member 22MA is supported by the second other fixed member 22FA. The second other connecting member 22A is supported by the second other intermediate member 22MA.

The second other connecting member 22A includes a second other connecting portion 22aA, a second other support connecting portion 22bA, and a second other intermediate connecting portion 22cA. The second other intermediate connecting portion 22cA is provided between the second other connecting portion 22aA and the second other support connecting portion 22bA. A direction from the second other connecting portion 22aA to the second other support connecting portion 22bA crosses the first direction D1. A direction from the second other support connecting portion 22bA to the second other connecting portion 22aA is along the second direction D2.

The second other support member 22SA is fixed to the base 51s. The second other support member 22SA supports the second intermediate connecting portion 22cA.

In this example, the element section 10E further includes a second other opposing support member 22SxA. The second other opposing support member 22SxA is fixed to the base 51s. The second opposing support member 22SxA supports the second intermediate connecting portion 22cA. The second other intermediate connecting portion 22cA is provided between the second other support member 22SA and the second other opposing support member 22SxA. As shown in FIG. 3, a part of the first gap g1 is provided between the base 51s and the second other connecting member 22A.

The second other cross fixed member 42FA is fixed to the base 51s. The second other cross intermediate member 42MA is supported by the second other cross fixed member 42FA. The second other cross connecting member 42CA is supported by the second other cross intermediate member 42MA.

The movable member 11M further includes a second other movable portion 11bA. The second other movable portion 11bA is supported by the second other support connecting portion 22bA and the second other cross connecting member 42CA.

By providing the second other support structure 20bA, for example, the movable member 11M is more stably supported.

As already described, the first intermediate member 21M may include the first layer 21L and the first insulating layer 21i (see FIG. 2). The first insulating layer 21i is provided between the base 51s and the first layer 21L. As shown in FIG. 2, the first other intermediate member 21MA may include a first other layer 21LA and a first other insulating layer 21iA. The first other insulating layer 21iA is between provided the base 51s and the first other layer 21LA. As shown in FIG. 3, the second intermediate member 22M may include a second layer 22L and a second insulating layer 22i. The second insulating layer 22i is provided between the base 51s and the second layer 22L. As shown in FIG. 3, the second other intermediate member 22MA may include a second other layer 22LA and a second other insulating layer 22iA. The second other insulating layer 22iA is provided between the base 51s and the second other layer 22LA.

FIGS. 6 to 9 are schematic cross-sectional views illustrating a sensor according to the first embodiment.

FIGS. 6 to 9 are cross-sectional views respectively corresponding to the line A1-A2, the line A3-A4, the line B1-B2, and the line B3-B4 in FIG. 1.

Figure 6:
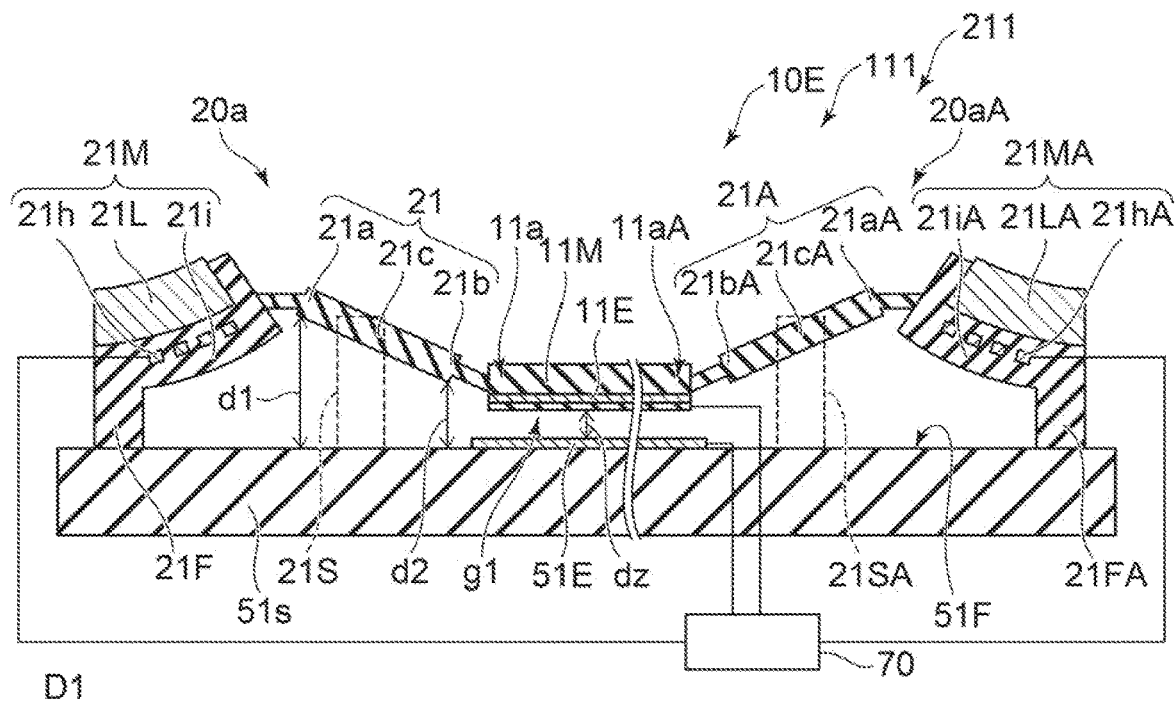
FIG. 6 is a schematic cross-sectional view illustrating a sensor according to the first embodiment.
Figure 7:
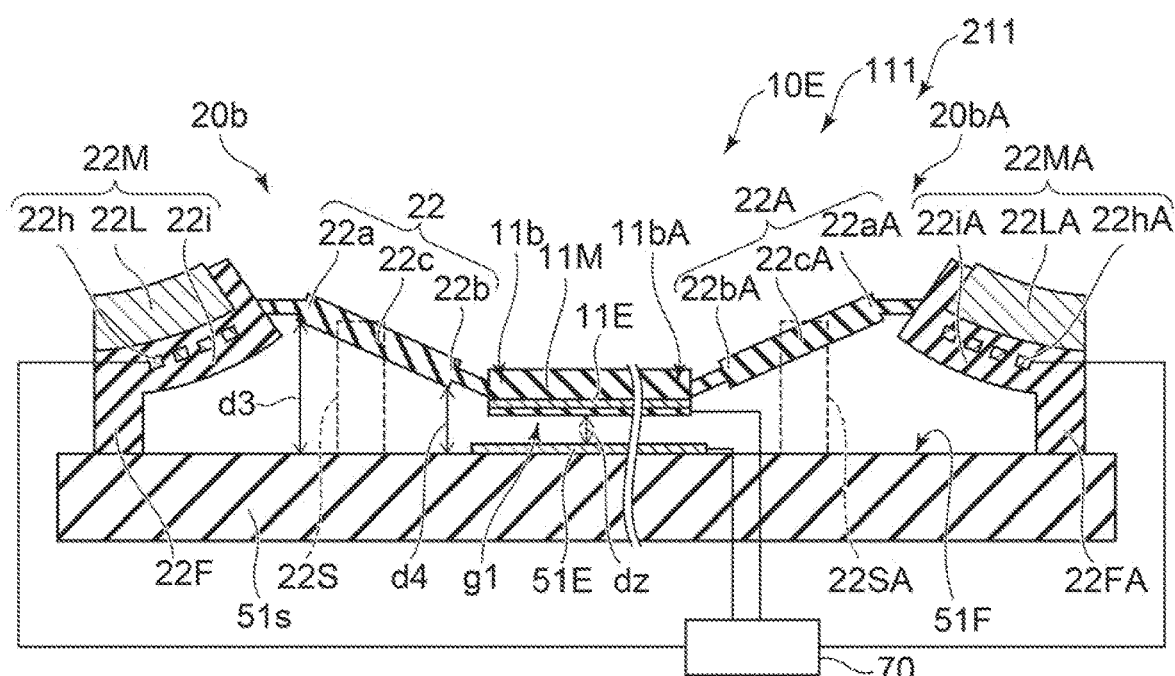
FIG. 7 is a schematic cross-sectional view illustrating the sensor according to the first embodiment.

As shown in FIG. 6, in a sensor 111 according to the embodiment, the first intermediate member 21M includes a first conductive member 21h. Except for this, the configuration of the sensor 111 may be the same as the configuration of the sensor 110.

When a first current is supplied to the first conductive member 21h, the distance (first distance d1) along the first direction D1 between the base 51s and the first connecting portion 21a decreases. At this time, the distance (second distance d2) along the first direction D1 between the base 51s and the first support connecting portion 21b increases. Then, the movable member 11M (first movable portion 11a) is displaced away from the base 51s. Such displacement results from expansion of a part of the first intermediate member 21M based on the current supplied to the first conductive member 21h. The first conductive member 21h functions, for example, as a heater.

Figure 8:
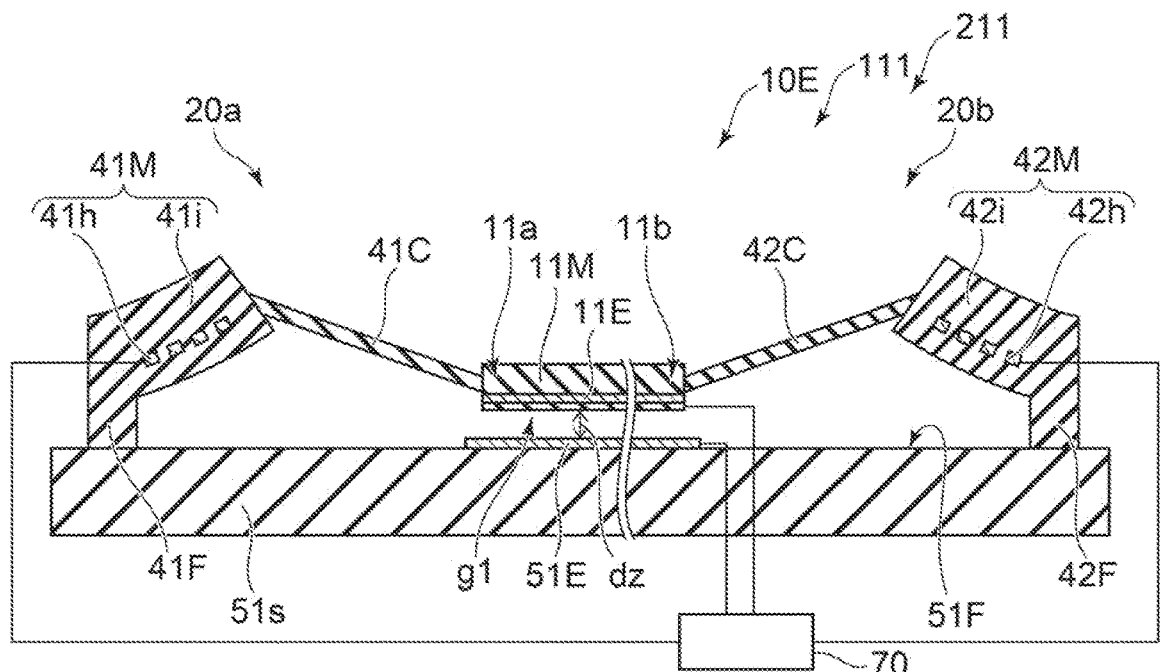
FIG. 8 is a schematic cross-sectional view illustrating the sensor according to the first embodiment.
Figure 9:
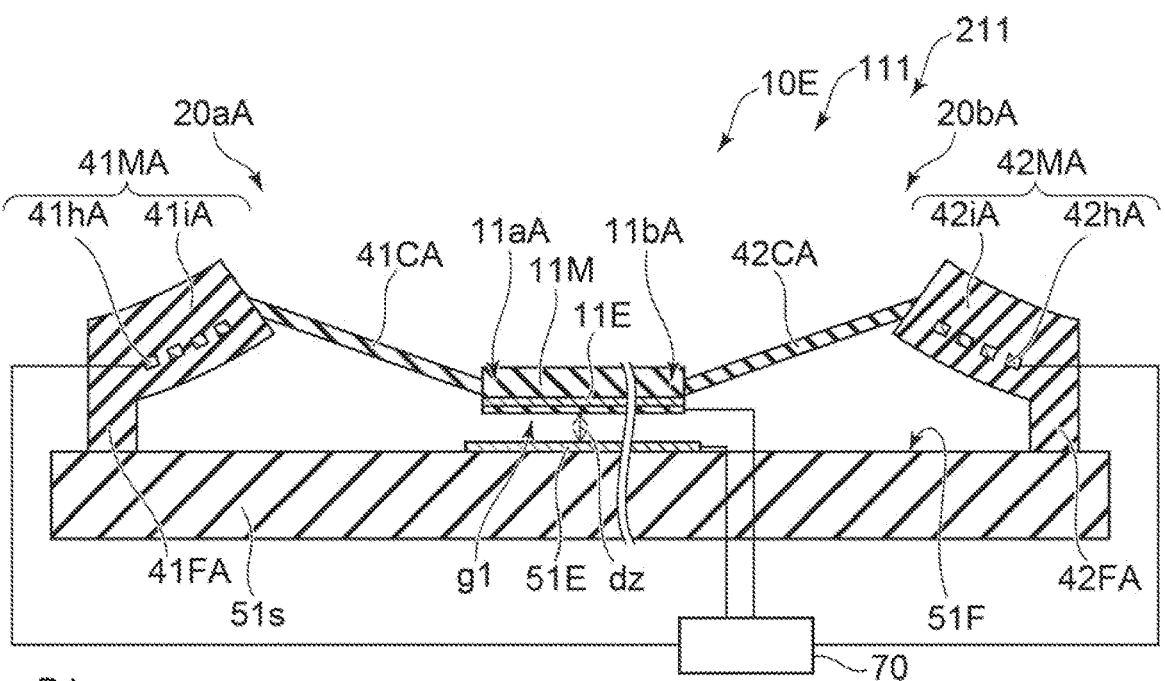
FIG. 9 is a schematic cross-sectional view illustrating the sensor according to the first embodiment.

As shown in FIG. 8, the first cross intermediate member 41M may include a first cross conductive member 41h. When a current is supplied to the first cross conductive member 41h, the movable member 11M is displaced so as to approach the base 51s. For example, the distance (substantially the inter-electrode distance dz) along the first direction D1 between the base 51s and the first movable portion 11a when a first cross current is supplied to the first cross conductive member 41h is shorter than the distance along the first direction D1 between the base 51s and the first movable portion 11a when the first cross current is not supplied to the first cross conductive member 41h. An insulating member 41i may be provided around the first cross conductive member 41h.

Thus, the direction of displacement of the movable member 11M (the first movable portion 11a) is opposite between the current supply to the first conductive member 21h and the current supply to the first cross conductive member 41h.

The position of the movable member 11M with respect to the base 51s can be controlled by controlling at least one of the current to the first conductive member 21h or the current to the first cross conductive member 41h.

The control of the current may be performed by the controller 70, for example. The controller 70 is configured to supply the first current to the first conductive member 21h. The controller 70 is configured to supply the first cross current to the first cross conductive member 41h.

In the sensor 111, the first other intermediate member 21MA may further include a first other conductive member 21hA.

In the sensor 111, the second intermediate member 22M may further include a second conductive member 22h. In the sensor 111, the second other intermediate member 22MA may further include the second other conductive member 22hA.

In the sensor 111, the first other cross intermediate member 41MA may include the first cross conductive member 41hA. In the sensor 111, the second cross intermediate member 42M may include a second cross conductive member 42h. In sensor 111, the second other cross intermediate member 42MA may include a second cross conductive member 42hA. An insulating member 41iA may be provided around the first other cross conductive member 41hA. An insulating member 42i may be provided around the second cross conductive member 42h. An insulating member 42iA may be provided around the second cross conductive member 42hA.

In one example, when the ambient temperature rises, current is supplied to the first cross conductive member 41h, the first other cross conductive member 41hA, the second cross conductive member 42h, and the second other cross conductive member 42hA. Thereby, the inter-electrode distance dz can be adjusted to a desired value (e.g., a center value).

In another example, when the ambient temperature is lowered, current is supplied to the first conductive member 21h, the first other conductive member 21hA, the second conductive member 22h, and the second other conductive member 22hA. Thereby, the inter-electrode distance dz can be adjusted to a desired value (e.g., a center value).

A current may be supplied to the conductive member included in one of a plurality of support structures (For example, the first support structure 20a, the first other support structure 20aA, the second support structure 20b, the second other support structure 20bA, and the like). Thereby, for example, the inclination (distortion) of the movable member 11M with respect to the base 51s can be adjusted and corrected.

Figure 10:
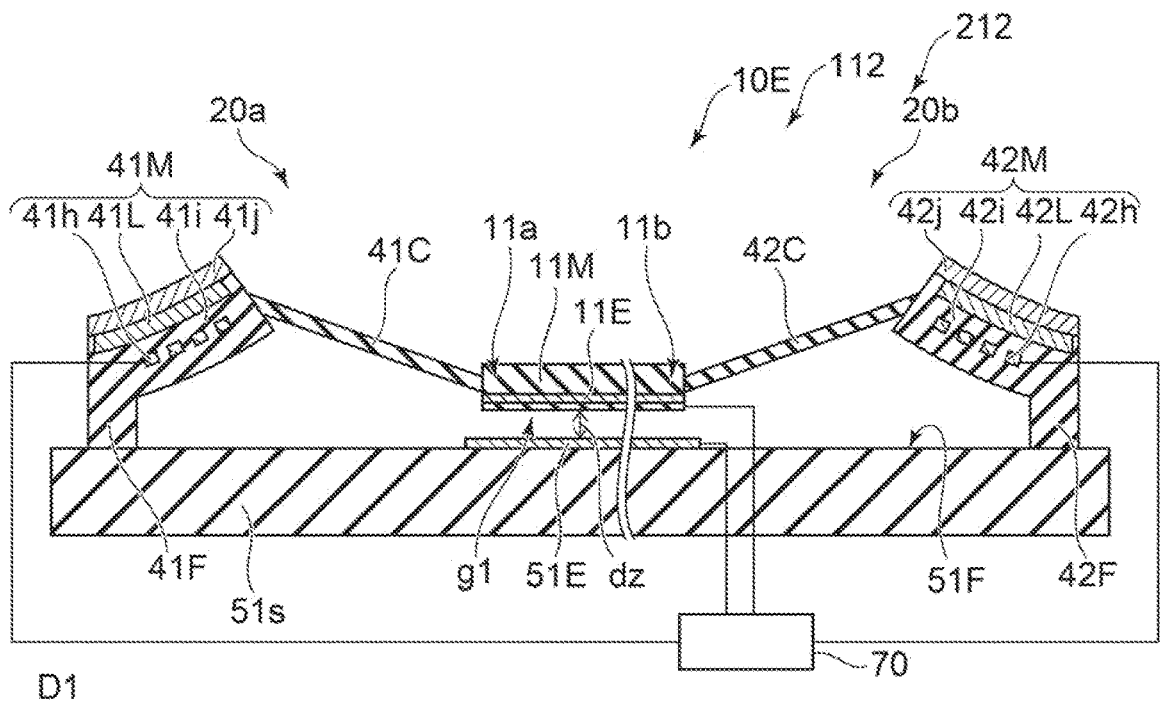
FIG. 10 is a schematic cross-sectional view illustrating a sensor according to the first embodiment.
Figure 11:
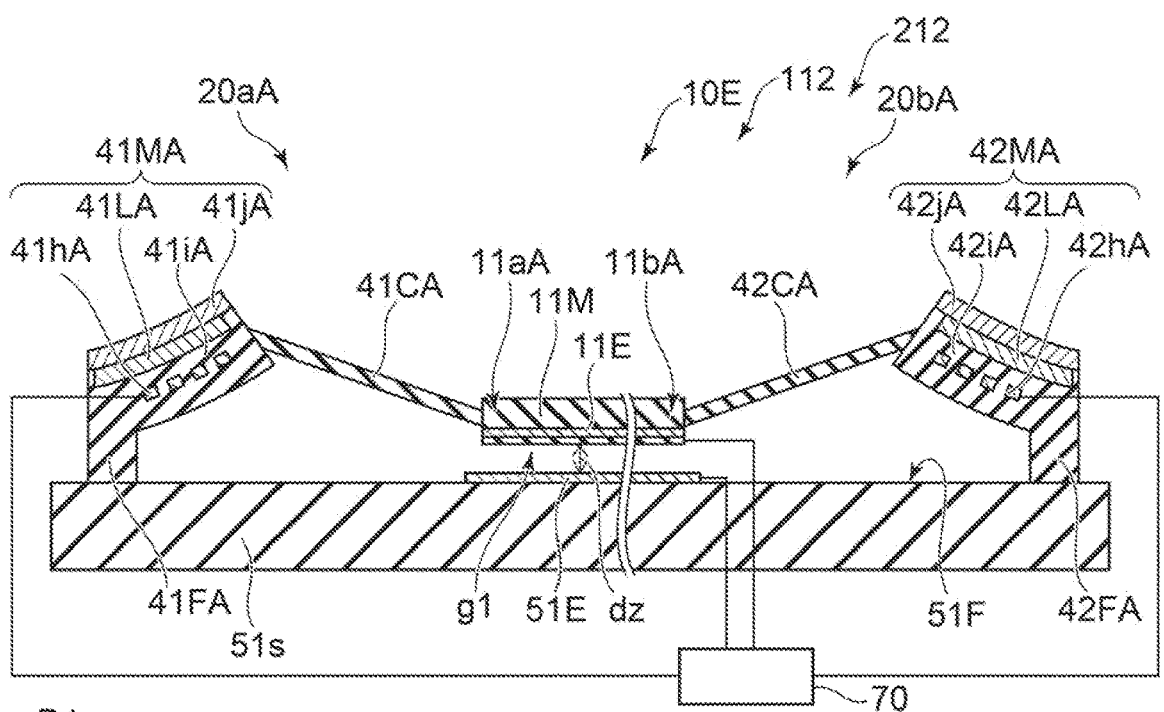
FIG. 11 is a schematic cross-sectional view illustrating the sensor according to the first embodiment.

FIGS. 10 and 11 are schematic cross-sectional views illustrating a sensor according to the first embodiment.

FIGS. 10 and 11 are cross-sectional views respectively corresponding to the line B1-B2 and the line B3-B4 in FIG. 1.

As shown in FIG. 10, in a sensor 112 according to the embodiment, the first cross intermediate member 41M includes a first cross layer 41L. Except for this, the configuration of the sensor 112 may be the same as the configuration of the sensor 111.

The material of the first cross layer 41L may be the same as the material of the first layer 21L. The first cross layer 41L is, for example, a sensitive film. In the sensor 112, the first cross intermediate member 41M may include a first cross cover layer 41j. The first cross layer 41L is provided between the base 51s and the first cross cover layer 41j. By providing the first cross cover layer 41j, the first cross layer 41L becomes substantially non-responsive to the detection target.

As shown in FIG. 10, in the sensor 112, the second cross intermediate member 42M may include the second cross layer 42L. The material of the second cross layer 42L may be the same as the material of the first layer 21L. In the sensor 112, the second cross intermediate member 42M may include the second cross cover layer 42j. The second cross layer 42L is provided between the base 51s and the second cross cover layer 42j.

As shown in FIG. 11, in the sensor 112, the first other cross intermediate member 41MA may include a first other cross layer 41LA. The material of the first other cross layer 41LA may be the same as the material of the first layer 21L. In the sensor 112, first other cross intermediate member 41MA may include a first other cross cover layer 41jA. The first other cross layer 41LA is provided between the base 51s and the first other cross cover layer 41jA.

As shown in FIG. 11, in the sensor 112, the second other cross intermediate member 42MA may include a second other cross layer 42LA. The material of the second other cross layer 42LA may be the same as the material of the first layer 21L. In the sensor 112, the second other cross intermediate member 42MA may include a second other cross cover layer 42jA. The second other cross layer 42LA is provided between the base 51s and the second other cross cover layer 42jA.

Figure 12:
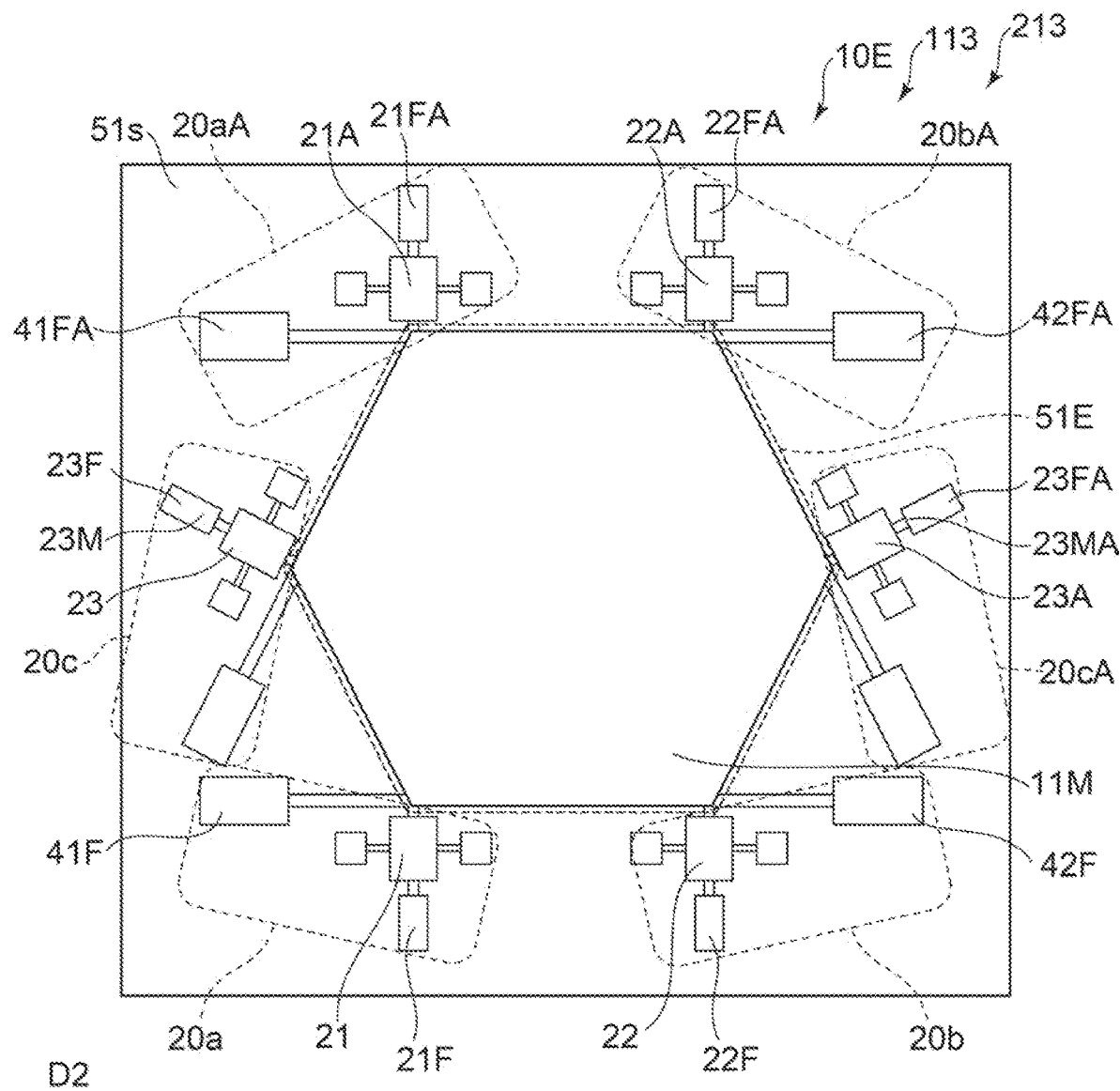
FIG. 12 is a schematic plan view illustrating a sensor according to the first embodiment.

FIG. 12 is a schematic plan view illustrating a sensor according to the first embodiment.

As shown in FIG. 12, in a sensor 113 according to the embodiment, the element section 10E includes a third support structure 20c and a third other support structure 20cA. Except for this, the configuration of the sensor 113 may be the same as the configuration of any one of the sensors 110-112.

The configuration of the third support structure 20c may be, for example, the same as the configuration of the first support structure 20a. The configuration of the third other support structure 20cA may be, for example, the same as the configuration of the first other support structure 20aA.

For example, the third support structure 20c includes a third fixed member 23F fixed to the base 51s, a third intermediate member 23M supported by the third fixed member 23F, and a third connecting member 23 supported by the third intermediate member 23M. The third connecting member 23 supports the movable member 11M. A direction from the third connecting member 23 to the movable member 11M is inclined with respect to the direction from the first connecting member 21 to the movable member 11M.

For example, the third other support structure 20cA includes a third other fixed member 23FA fixed to the base 51s, a third other intermediate member 23MA supported by the third other fixed member 23FA, and a third other connecting member 23A supported by the third other intermediate member 23MA. The third other connecting member 23A supports the movable member 11M. A direction from the third other connecting member 23A to the movable member 11M crosses the direction from the first other connecting member 21A to the movable member 11M.

In the sensor 113 as well, for example, the influence of temperature can be suppressed, enabling detection with higher accuracy. A wide dynamic range is also obtained in the sensor 113. High sensitivity is obtained. The sensor 113 can also provide a sensor whose characteristics can be improved.

Figure 13:
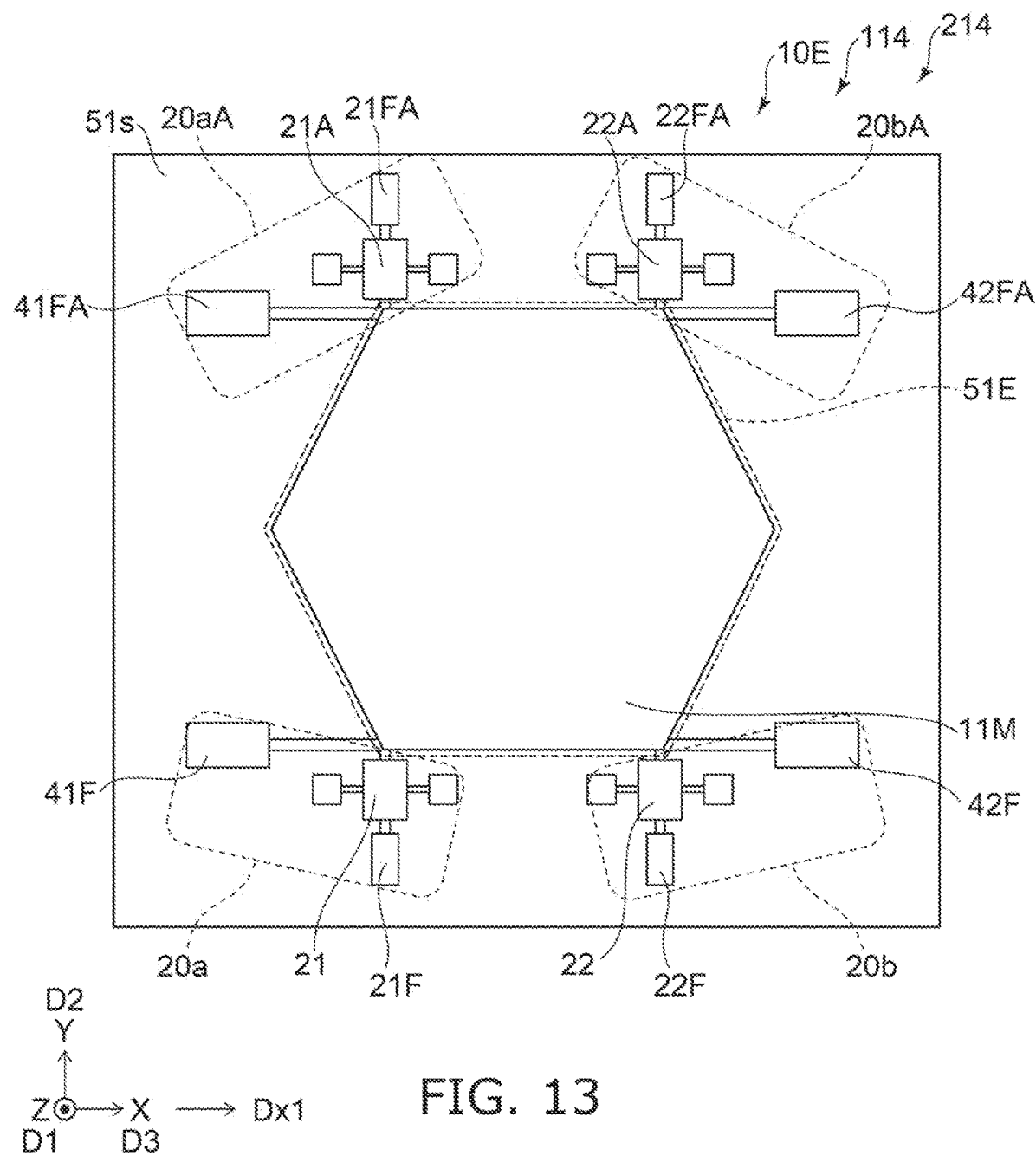
FIG. 13 is a schematic plan view illustrating a sensor according to the first embodiment.

FIG. 13 is a schematic plan view illustrating a sensor according to the first embodiment.

As shown in FIG. 13, in a sensor 114 according to the embodiment, the third support structure 20c and the third other support structure 20cA are omitted. Except for this, the configuration of the sensor 114 may be the same as the configuration of the sensor 113. The sensor 114 can also provide improved characteristics.

Second Embodiment

The second embodiment relates to a capacitor device.

The capacitor device according to the second embodiment may have the same configuration as the sensors according to the first embodiment. For example, the configuration of a capacitor device 210 (see FIG. 1) may be similar to the configuration of the sensor 110. For example, the influence of temperature can be suppressed.

For example, the configuration of the capacitor device 211 (see FIGS. 6 to 9) may be similar to that of the sensor 111. For example, in the capacitor device 211, the element section 10E includes the fixed electrode 51E, the first support structure 20a, and the movable member 11M. The fixed electrode 51E is fixed to the base 51s. The first support structure 20a includes the first fixed member 21F fixed to the base 51s, the first intermediate member 21M supported by the first fixed member 21F, the first connecting member 21 supported by the first intermediate member 21M, the first support member 21S, the first cross fixed member 41F fixed to the base 51s, the first cross intermediate member 41M supported by the first cross fixed member 41F, and the first cross connecting member 41C supported by the first cross intermediate member 41M.

The first connecting member 21 includes the first connecting portion 21a, the first support connecting portion 21b, and the first intermediate connecting portion 21c. The first intermediate connecting portion 21c is provided between the first connecting portion 21a and the first support connecting portion 21b. The direction from the first connecting portion 21a to the first support connecting portion 21b is along the second direction D2 crossing the first direction D1 from the base 51s to the fixed electrode 51E. The first support member 21S is fixed to the base 51s and supports the first intermediate connecting portion 21c.

The movable member 11M includes the movable electrode 11E. The movable member 11M includes the first movable portion 11a. The first movable portion 11a is supported by the first support connecting portion 21b and the first cross connecting member 41C. The first gap g1 is provided between the fixed electrode 51E and the movable member 11M.

In the capacitor device 211, the first intermediate member 21M includes the first conductive member 21h. The controller 70 is configured to supply the first current to the first conductive member 21h. When the first current is supplied to the first conductive member 21h, the first distance d1 along the first direction D1 between the base 51s and the first connecting portion 21a decreases, and the second distance d2 along the first direction D1 between the base 51s and the first support connecting portion 21b increases.

In the capacitor device 211, the first cross intermediate member 41M may include the first cross conductive member 41h (see FIG. 8). When a current is supplied to the first cross conductive member 41h, the movable member 11M is displaced so as to approach the base 51s. For example, the distance (substantially the inter-electrode distance dz) along the first direction D1 between the base 51s and the first movable portion 11a when the first cross current is supplied to the first cross conductive member 41h is shorter than the distance along the first direction D1 between the base 51s and the first movable portion 11a when the first cross current is not supplied to the first cross conductive member 41h.

Thus, the direction of displacement of the movable member 11M (the first movable portion 11a) is opposite between the current supply to the first conductive member 21h and the current supply to the first cross conductive member 41h.

By controlling these currents, the target capacitance can be obtained with high accuracy. For example, the influence of temperature is suppressed.

A capacitor device 212 according to the embodiment may have the configuration of the sensor 112. A capacitor device 213 according to the embodiment may have the configuration of the sensor 113. A capacitor device 214 according to the embodiment may have the configuration of the sensor 114.

The embodiments may include the following configurations (for example, technical proposals).

Configuration 1

A sensor, comprising:

a base; and an element section, the element section including a fixed electrode, a first support structure, and a movable member, the fixed electrode being fixed to the base, the first support structure including a first fixed member fixed to the base, a first intermediate member supported by the first fixed member, a first connecting member supported by the first intermediate member, the first connecting member including a first connecting portion, a first support connecting portion, and a first intermediate connecting portion provided between the first connecting portion and the first support connecting portion, a direction from the first connecting portion to the first support connecting portion being along a second direction crossing a first direction from the base to the fixed electrode, a first support member fixed to the base, the first support member supporting the first intermediate connecting portion, a first cross fixed member fixed to the base, a first cross intermediate member supported by the first cross fixed member, and a first cross connecting member supported by the first cross intermediate member, the movable member including a movable electrode, the movable member including a first movable portion, the first movable portion being supported by the first support connecting portion and the first cross connecting member, and a first gap being provided between the fixed electrode and the movable member.

Configuration 2
The sensor according to Configuration 1, wherein
a first crossing direction from the first support member to the first intermediate connecting portion crosses a plane including the first direction and the second direction.

Configuration 3
The sensor according to Configuration 1 or 2, wherein
a direction from the first connecting member to the first movable portion is along the second direction, and
a direction from the first cross connecting member to the first movable portion crosses the first direction and the second direction.

Configuration 4
The sensor according to Configuration 3, wherein
the element section further includes a first opposing support member,
the first opposing support member is fixed to the base,
the first opposing support member supports the first intermediate connecting portion,
the first intermediate connecting portion is provided between the first support member and the first opposing support member, and
a part of the first gap is provided between the base and the first connecting member.

Configuration 5
The sensor according to any one of Configurations 1-4, wherein
when a first distance along the first direction between the base and the first connecting portion decreases, a second distance along the first direction between the base and the first support connecting portion increases.

Configuration 6
The sensor according to any one of Configurations 1-4, wherein
a first distance along the first direction between the base and the first connecting portion in a first state is shorter than the first distance in a second state, and
a second distance along the first direction between the base and the first support connecting portion in the first state is longer than the second distance in the second state.

Configuration 7
The sensor according to Configuration 6, wherein
a concentration of a detection target existing around the element section in the first state is higher than a concentration of the detection target in the second state.

Configuration 8
The sensor according to Configuration 7, wherein
the first intermediate member includes a first layer, the first layer includes at least one selected from the group consisting of palladium, platinum and gold, and
the detection target includes hydrogen.

Configuration 9
The sensor according to Configuration 8, wherein
the first intermediate member further includes a first insulating layer, and
the first insulating layer is provided between the base and the first layer.

Configuration 10
The sensor according to any one of Configurations 1-9, wherein
the element section further includes a first other support structure,
the first other support structure includes
a first other fixed member fixed to the base,
a first other intermediate member supported by the first other fixed member,
a first other connecting member supported by the first other intermediate member, the first other connecting member including a first other connecting portion, a first other support connecting portion, and a first other intermediate connecting portion provided between the first other connecting portion and the first other support connecting portion, a direction from the first other connecting portion to the first other support connecting portion crossing the first direction,
a first other support member fixed to the base, the first other support member supporting the first other intermediate connecting portion,
a first other cross fixed member fixed to the base,
a first other cross intermediate member supported by the first other cross fixed member, and
a first other cross connecting member supported by the first other cross intermediate member,
the movable member further includes a first other movable portion, and
the first other movable portion is supported by the first other support connecting portion and the first other cross connecting member.

Configuration 11
The sensor according to Configuration 10, wherein
the element section further includes a first other opposing support member,
the first other opposing support member is fixed to the base,
the first other opposing support member supports the first other intermediate connecting portion;
the first other intermediate connecting portion is provided between the first other support member and the first other opposing support member, and
a part of the first gap is provided between the base and the first other connecting member.

Configuration 12
The sensor according to Configuration 10 or 11, wherein
a direction from the first other support connecting portion to the first support connecting portion is along the second direction.

Configuration 13
The sensor according to any one of Configurations 1-12, wherein
the first intermediate member further includes a first conductive member, and
when a first current is supplied to the first conductive member, a distance between the base and the first connecting portion along the first direction decreases, and a distance between the base and the first support connecting portion along the first direction increases.

Configuration 14
The sensor according to Configuration 13, wherein
the first cross intermediate member further includes a first cross conductive member,
a distance between the base and the first movable portion along the first direction in a state where a first cross current is supplied to the first cross conductive member is shorter than a distance between the base and the first movable portion along the first direction in a state where the first cross current is not supplied to the first cross conductive member.

Configuration 15
The sensor according to Configuration 14, further comprising:

a controller,
the controller being configured to supply the first current to the first conductive member, and
the controller being configured to supply the first cross current to the first cross conductive member.

Configuration 16

The sensor according to any one of Configurations 1-15, wherein
the element section further includes a second support structure,
the second support structure includes
a second fixed member fixed to the base,
a second intermediate member supported by the second fixed member,
a second connecting member supported by the second intermediate member, the second connecting member including a second connecting portion, a second support connecting portion, and a second intermediate connecting portion provided between the second connecting portion and the second support connecting portion, a direction from the second connecting portion to the second support connecting portion crossing the first direction,
a second support member fixed to the base, the second support member supporting the second intermediate connecting portion,
a second cross fixed member fixed to the base,
a second cross intermediate member supported by the second cross fixed member, and
a second cross connecting member supported by the second cross intermediate member,
the movable member further includes a second movable portion, and
the second movable portion is supported by the second support connecting portion and the second cross connecting member.

Configuration 17

The sensor according to Configuration 16, wherein
the element section further includes a second other support structure,
the second other support structure includes
a second other fixed member fixed to the base,
a second other intermediate member supported by the second other fixed member,
a second other connecting member supported by the second other intermediate member, the second other connecting member including a second other connecting portion, a second other support connecting portion, and a second other intermediate connecting portion provided between the second other connecting portion and the second other support connecting portion, a direction from the second other connecting portion to the second other support connecting portion crossing the first direction,
a second other support member fixed to the base, the second other support member supporting the second other intermediate connecting portion,
a second other cross fixed member fixed to the base,
a second other cross intermediate member supported by the second other cross fixed member, and
a second other cross connecting member supported by the second other cross intermediate member,
the movable member further includes a second other movable portion, and
the second other movable portion is supported by the second other support connecting portion and the second other cross connecting member.

Configuration 18

A capacitor device, comprising:
a base; and
an element section,
the element section including a fixed electrode, a first support structure, and a movable member,
the fixed electrode being fixed to the base,
the first support structure including
a first fixed member fixed to the base,
a first intermediate member supported by the first fixed member,
a first connecting member supported by the first intermediate member, the first connecting member including a first connecting portion, a first support connecting portion, and a first intermediate connecting portion provided between the first connecting portion and the first support connecting portion, a direction from the first connecting portion to the first support connecting portion being along a second direction crossing a first direction from the base to the fixed electrode,
a first support member fixed to the base, the first support member supporting the first intermediate connecting portion,
a first cross fixed member fixed to the base,
a first cross intermediate member supported by the first cross fixed member, and
a first cross connecting member supported by the first cross intermediate member,
the movable member including a movable electrode,
the movable member including a first movable portion,
the first movable portion being supported by the first support connecting portion and the first cross connecting member, and
a first gap being provided between the fixed electrode and the movable member.

Configuration 19

The capacitor device according to Configuration 18, further comprising:
a controller,
the first intermediate member including a first conductive member,
the controller being configures to supply a first current to the first conductive member, and
when the first current is supplied to the first conductive member, a first distance between the base and the first connecting portion along the first direction being configured to decrease, and a second distance between the base and the first support connecting portion along the first direction being configured to increase.

According to the embodiments, it is possible to provide a sensor and capacitor device capable of improving characteristics.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors and capacitor devices such as, bases, element sections, fixed electrodes, fixed members, intermediate members, connecting members, movable portions, support members, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors and capacitor devices practicable by an appropriate design modification by one skilled in the art based on the sensors and the capacitor devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
a base; and
an element section,
the element section including a fixed electrode, a first support structure, and a movable member,
the fixed electrode being fixed to the base,
the first support structure including
  a first fixed member fixed to the base,
  a first intermediate member supported by the first fixed member,
  a first connecting member supported by the first intermediate member, the first connecting member including a first connecting portion, a first support connecting portion, and a first intermediate connecting portion provided between the first connecting portion and the first support connecting portion, a direction from the first connecting portion to the first support connecting portion being along a second direction crossing a first direction from the base to the fixed electrode,
  a first support member fixed to the base, the first support member supporting the first intermediate connecting portion,
  a first cross fixed member fixed to the base,
  a first cross intermediate member supported by the first cross fixed member, and
  a first cross connecting member supported by the first cross intermediate member,
the movable member including a movable electrode,
the movable member including a first movable portion,
the first movable portion being supported by the first support connecting portion and the first cross connecting member, and
a first gap being provided between the fixed electrode and the movable member.

2. The sensor according to claim 1, wherein
a first crossing direction from the first support member to the first intermediate connecting portion crosses a plane including the first direction and the second direction.

3. The sensor according to claim 1, wherein
a direction from the first connecting member to the first movable portion is along the second direction, and
a direction from the first cross connecting member to the first movable portion crosses the first direction and the second direction.

4. The sensor according to claim 3, wherein
the element section further includes a first opposing support member,
the first opposing support member is fixed to the base,
the first opposing support member supports the first intermediate connecting portion,
the first intermediate connecting portion is provided between the first support member and the first opposing support member, and
a part of the first gap is provided between the base and the first connecting member.

5. The sensor according to claim 1, wherein
when a first distance along the first direction between the base and the first connecting portion decreases, a second distance along the first direction between the base and the first support connecting portion increases.

6. The sensor according to claim 1, wherein
a first distance along the first direction between the base and the first connecting portion in a first state is shorter than the first distance in a second state, and
a second distance along the first direction between the base and the first support connecting portion in the first state is longer than the second distance in the second state.

7. The sensor according to claim 6, wherein
a concentration of a detection target existing around the element section in the first state is higher than a concentration of the detection target in the second state.

8. The sensor according to claim 7, wherein
the first intermediate member includes a first layer,
the first layer includes at least one selected from the group consisting of palladium, platinum and gold, and
the detection target includes hydrogen.

9. The sensor according to claim 8, wherein
the first intermediate member further includes a first insulating layer, and
the first insulating layer is provided between the base and the first layer.

10. The sensor according to claim 1, wherein
the element section further includes a first other support structure,
the first other support structure includes
  a first other fixed member fixed to the base,
  a first other intermediate member supported by the first other fixed member,
  a first other connecting member supported by the first other intermediate member, the first other connecting member including a first other connecting portion, a first other support connecting portion, and a first other intermediate connecting portion provided between the first other connecting portion and the first other support connecting portion, a direction from the first other connecting portion to the first other support connecting portion crossing the first direction, a first other support member fixed to the base, the first other support member supporting the first other intermediate connecting portion, a first other cross fixed member fixed to the base, a first other cross intermediate member supported by the first other cross fixed member, and a first other cross connecting member supported by the first other cross intermediate member, the movable member further includes a first other movable portion, and the first other movable portion is supported by the first other support connecting portion and the first other cross connecting member.

11. The sensor according to claim 10, wherein the element section further includes a first other opposing support member, the first other opposing support member is fixed to the base, the first other opposing support member supports the first other intermediate connecting portion;

the first other intermediate connecting portion is provided between the first other support member and the first other opposing support member, and a part of the first gap is provided between the base and the first other connecting member.

12. The sensor according to claim 10, wherein a direction from the first other support connecting portion to the first support connecting portion is along the second direction.

13. The sensor according to claim 1, wherein the first intermediate member further includes a first conductive member, and when a first current is supplied to the first conductive member, a distance between the base and the first connecting portion along the first direction decreases, and a distance between the base and the first support connecting portion along the first direction increases.

14. The sensor according to claim 13, wherein the first cross intermediate member further includes a first cross conductive member, a distance between the base and the first movable portion along the first direction in a state where a first cross current is supplied to the first cross conductive member is shorter than a distance between the base and the first movable portion along the first direction in a state where the first cross current is not supplied to the first cross conductive member.

15. The sensor according to claim 1, further comprising:

a controller, the controller being configured to supply the first current to the first conductive member, and the controller being configured to supply the first cross current to the first cross conductive member.

16. The sensor according to claim 1, wherein the element section further includes a second support structure, the second support structure includes a second fixed member fixed to the base, a second intermediate member supported by the second fixed member, a second connecting member supported by the second intermediate member, the second connecting member including a second connecting portion, a second support connecting portion, and a second intermediate connecting portion provided between the second connecting portion and the second support connecting portion, a direction from the second connecting portion to the second support connecting portion crossing the first direction, a second support member fixed to the base, the second support member supporting the second intermediate connecting portion, a second cross fixed member fixed to the base, a second cross intermediate member supported by the second cross fixed member, and a second cross connecting member supported by the second cross intermediate member, the movable member further includes a second movable portion, and the second movable portion is supported by the second support connecting portion and the second cross connecting member.

17. The sensor according to claim 16, wherein the element section further includes a second other support structure, the second other support structure includes a second other fixed member fixed to the base, a second other intermediate member supported by the second other fixed member, a second other connecting member supported by the second other intermediate member, the second other connecting member including a second other connecting portion, a second other support connecting portion, and a second other intermediate connecting portion provided between the second other connecting portion and the second other support connecting portion, a direction from the second other connecting portion to the second other support connecting portion crossing the first direction, a second other support member fixed to the base, the second other support member supporting the second other intermediate connecting portion, a second other cross fixed member fixed to the base, a second other cross intermediate member supported by the second other cross fixed member, and a second other cross connecting member supported by the second other cross intermediate member, the movable member further includes a second other movable portion, and the second other movable portion is supported by the second other support connecting portion and the second other cross connecting member.

18. A capacitor device, comprising:

a base; and an element section, the element section including a fixed electrode, a first support structure, and a movable member, the fixed electrode being fixed to the base, the first support structure including a first fixed member fixed to the base, a first intermediate member supported by the first fixed member, a first connecting member supported by the first intermediate member, the first connecting member including a first connecting portion, a first support connecting portion, and a first intermediate connecting portion provided between the first connecting portion and the first support connecting portion, a direction from the first connecting portion to the first support connecting portion being along a second direction crossing a first direction from the base to the fixed electrode, a first support member fixed to the base, the first support member supporting the first intermediate connecting portion, a first cross fixed member fixed to the base, a first cross intermediate member supported by the first cross fixed member, and a first cross connecting member supported by the first cross intermediate member, the movable member including a movable electrode, the movable member including a first movable portion, the first movable portion being supported by the first support connecting portion and the first cross connecting member, and a first gap being provided between the fixed electrode and the movable member.

19. The capacitor device according to claim 18, further comprising:

a controller, the first intermediate member including a first conductive member, the controller being configures to supply a first current to the first conductive member, and when the first current is supplied to the first conductive member, a first distance between the base and the first connecting portion along the first direction being configured to decrease, and a second distance between the base and the first support connecting portion along the first direction being configured to increase.

\* \* \* \* \*